United States Patent [19]
Desmond et al.

[11] Patent Number: 5,572,354
[45] Date of Patent: Nov. 5, 1996

[54] REARVIEW MIRROR SUPPORT BRACKET WITH RETAINING PROTRUSION, REARVIEW MIRROR CASE AND REFLECTIVE ELEMENT

[75] Inventors: John Desmond, Newbridge; Patrick MacNamara, Naas; Sean McCormack, Newbridge; Patrick Lawlor, Dublin, all of Ireland

[73] Assignee: Donnelly Mirrors, Ltd., Naas, Ireland

[21] Appl. No.: 210,358

[22] Filed: Mar. 18, 1994

[30] Foreign Application Priority Data

| Mar. 19, 1993 | [IE] | Ireland | 930210 |
| Mar. 19, 1993 | [IE] | Ireland | 930211 |
| Mar. 19, 1993 | [IE] | Ireland | 930212 |

[51] Int. Cl.$^6$ .................................................. G02B 5/10
[52] U.S. Cl. ..................... 359/265; 359/871; 359/872; 359/603
[58] Field of Search .................. 359/871, 872, 359/602, 603, 604, 605, 606, 877, 876, 214, 844, 607, 265

[56] References Cited

U.S. PATENT DOCUMENTS

| D. 289,989 | 5/1987  | Skogler et al. . |         |
| D. 300,312 | 3/1989  | Skogler et al. . |         |
| 2,806,408  | 9/1957  | Moeller .        |         |
| 2,821,115  | 1/1958  | Weinrich et al.  | 359/607 |
| 3,059,539  | 10/1962 | Meade .          |         |
| 3,063,342  | 11/1962 | Zeek .           |         |
| 3,075,430  | 1/1963  | Woodward et al. .|         |
| 3,152,216  | 10/1964 | Woodward .       |         |
| 3,543,018  | 11/1970 | Barcus et al. .  |         |
| 3,575,496  | 4/1971  | Rochester et al. | 359/214 |
| 3,596,867  | 8/1971  | Allander         | 248/475 |
| 3,680,951  | 8/1972  | Jordan et al.    | 359/606 |
| 3,901,587  | 8/1975  | Haile            | 359/872 |
| 3,928,894  | 12/1975 | Bury et al.      | 248/467 |
| 4,012,022  | 3/1977  | Tomita           | 248/475 |

(List continued on next page.)

FOREIGN PATENT DOCUMENTS

| 1292308   | 9/1962  | France .          |
| 7319284   | 8/1973  | Germany .         |
| 3041692   | 8/1981  | Germany .         |
| 8526206.4 | 9/1985  | Germany .         |
| 3437775   | 4/1986  | Germany .         |
| D. 8970   | 6/1990  | Ireland .         |
| 525129    | 1/1977  | Japan .           |
| 885198    | 12/1961 | United Kingdom .  |
| 909769    | 11/1962 | United Kingdom .  |
| 1224875   | 3/1971  | United Kingdom .  |
| 1384714   | 2/1975  | United Kingdom .  |
| 1387591   | 3/1975  | United Kingdom .  |
| 1395699   | 5/1975  | United Kingdom .  |
| 1131236   | 10/1981 | United Kingdom .  |
| 2048803   | 5/1983  | United Kingdom .  |
| WO8401132 | 3/1984  | WIPO .            |

OTHER PUBLICATIONS

Gentex Visions, Winter 1987; vol. 1, No. 1, pp. 1–2. Electrochromic Mirrors, Donnelly Corporation (Feb. 15, 1990).
Photographs of Gentex Electrochromic Automatic Rearview Mirror, Gentex Corporation, Zeeland Michigan, on sale in the United States as of Jan. 1989, entire document.

*Primary Examiner*—David C. Nelms
*Assistant Examiner*—Vu A. Le
*Attorney, Agent, or Firm*—Van Dyke, Gardner, Linn & Burkhart, LLP

[57] ABSTRACT

A support bracket for mounting a mirror on a vehicle, the support bracket having at one end means for mounting the bracket onto a vehicle and means at the other end for mounting a mirror. The means for mounting the mirror comprises retaining means to substantially prevent disengagement of the mirror from the bracket. A rearview mirror case is disclosed wherein the case comprises a case body having an integrally formed socket for receiving one end of a complementary support bracket. A rearview mirror is disclosed comprising a reflective element actuatable between at least two reflective conditions and shock absorbing means abutting a rear surface of the reflective element.

14 Claims, 4 Drawing Sheets

U.S. PATENT DOCUMENTS

| | | | |
|---|---|---|---|
| 4,254,931 | 3/1981 | Aikens et al. | 248/549 |
| 4,286,841 | 9/1981 | Deshaw | 359/876 |
| 4,443,057 | 4/1984 | Bauer et al. | 359/606 |
| 4,448,488 | 5/1984 | Nakaho | 359/606 |
| 4,488,777 | 12/1984 | Bauer et al. | 359/606 |
| 4,524,941 | 6/1985 | Wood et al. | 35/544 |
| 4,632,348 | 12/1986 | Keesling et al. | 248/222.1 |
| 4,669,825 | 6/1987 | Itoh et al. | 359/38 |
| 4,726,656 | 2/1988 | Schofield et al. | 359/603 |
| 4,733,336 | 3/1988 | Skogler et al. | 362/142 |
| 4,741,603 | 5/1988 | Miyagi et al. | 359/602 |
| 4,936,533 | 6/1990 | Adams et al. | 248/222.1 |
| 4,948,242 | 8/1990 | Desmond et al. | 359/877 |
| 4,995,581 | 2/1991 | Koiwai et al. | |
| 5,016,979 | 5/1991 | Yoshino | 359/872 |
| 5,058,851 | 10/1991 | Lawlor et al. | 248/549 |
| 5,066,112 | 11/1991 | Lynam et al. | 359/267 |
| 5,073,019 | 12/1991 | Ferreira do Espírito Santo | 359/872 |
| 5,151,824 | 9/1992 | O'Farrell | 359/604 |
| 5,178,448 | 1/1993 | Adams et al. | 362/83.1 |

{ # 5,572,354

REARVIEW MIRROR SUPPORT BRACKET WITH RETAINING PROTRUSION, REARVIEW MIRROR CASE AND REFLECTIVE ELEMENT

BACKGROUND OF THE INVENTION

1. Field of the Invention

The present invention relates to rearview mirrors for example electro-optic rearview mirrors and in particular to electro-optic rearview mirrors in which two glass plates sandwich an electro-optic medium.

2. Description of the Prior Art

Brackets for supporting rearview mirrors are well known in the art, for example in U.S. Pat. Nos. 4,936,533, 5,058, 851, 4,524,941 and 4,012,022. The rearview mirrors are mounted to the brackets by means of a ball and socket connection. A problem with these constructions however is that the mirror casing can in certain circumstances be removed from the bracket. The above prior art Patents also disclose a case for a rearview mirror, i.e. a housing for holding the reflective element. These housings usually have fixed thereto a socket member for receiving the ball part of a support bracket so that the mirror housing is adjustable on the bracket. The number of components which may be employed in construction of such mirror assemblies results in high assembly cost and time, and the possibility of vibration between parts.

Electro-optic rearview mirrors are well known in the art for example in U.S. Pat. No. 5,140,455, U.S. Pat. No. 5,151,816 and as described in the following paper:- N. R. Lynam, "Electrochromic Automotive Day/Night Mirrors", *SAE Technical Paper Series*, (870636) (1987).

SUMMARY OF THE INVENTION

According to one aspect of the present invention there is provided a support bracket for mounting an article on a vehicle said support bracket having at one end means for mounting the bracket onto a vehicle and means at the other end for mounting an article, said means for mounting the article further comprising retaining means to substantially prevent disengagement of said article from said bracket.

Preferably, the article is a vehicle rearview mirror. More preferably the article is a vehicle interior rearview mirror.

Further preferably, said means for mounting the rearview mirror comprises a generally spherical ball for insertion in a complementary socket provided in the mirror case.

More preferably, the retaining means comprises a protrusion provided on the spherical ball, said protrusion acting to substantially prevent disengagement of said mirror case from said bracket.

The protrusion preferably comprises a generally cylindrical member integrally formed with said spherical ball. The protrusion further comprises flange means to further prevent disengagement of said mirror case from said bracket.

According to a second aspect of the present invention there is provided a rearview mirror case, wherein said case comprises a case body having an integrally formed socket for receiving one end of a complementary support bracket.

The socket preferably projects rearwardly of said mirror case and comprises a first wall defining at least a partially spherical recess for accommodating a spherical ball provided on one end of a support bracket.

Further preferably, the socket comprises a second wall extending rearwardly of said first wall, the second wall being of less thickness than said first wall and having an inherent resilience to enable the spherical ball of the bracket to be forced into the partially spherical recess.

A plurality of slots are preferably provided in the second wall, which extend slightly into the first wall, such that the second wall comprises a plurality of wall portions. A resilient tightening split ring is provided to embrace the wall portions of the second wall to cause the second wall portions to close slightly around the spherical ball of the bracket when the spherical ball is accommodated in the socket.

According to yet a third aspect of the present invention there is provided a reflective element for a rearview mirror, said reflective element comprising a reflective element actuatable between at least two reflective conditions, and shock absorbing means abutting to a rear surface of said reflective element.

Preferably, said shock absorbing means comprises a layer of foam adhered to the rear surface of the reflective element. The invention further provides a reflective element for a rearview mirror, said reflective element actuatable between at least two reflective conditions and resilient means abutting a rear surface of said reflective element. The resilient means is preferably a layer of resilient material. The resilient material is preferably adhered to the rear surface of the reflective element. The invention further provides a rearview mirror assembly comprising first and second spaced optically transparent elements mounted in a mirror case, each having front and rear surfaces and defining a space between the rear surface of the first element and the front surface of the second element, an electro-optic medium confined in the space whose light transmittance is variable upon the application of an electric field thereto; means for applying an electric field to the electro-optic medium to cause a change in the light transmittance of the medium; a reflective coating on one surface of the second element to reflect light incident thereon through said electro-optic medium and the first element; and shock absorbing means adhered to the rear surface of the second element for reducing the risk of breaking of the first and second elements.

Embodiments of the invention will now be described, by way of example, with reference to the accompanying drawings, in which:

DESCRIPTION OF THE PREFERRED EMBODIMENTS

Figure 1:
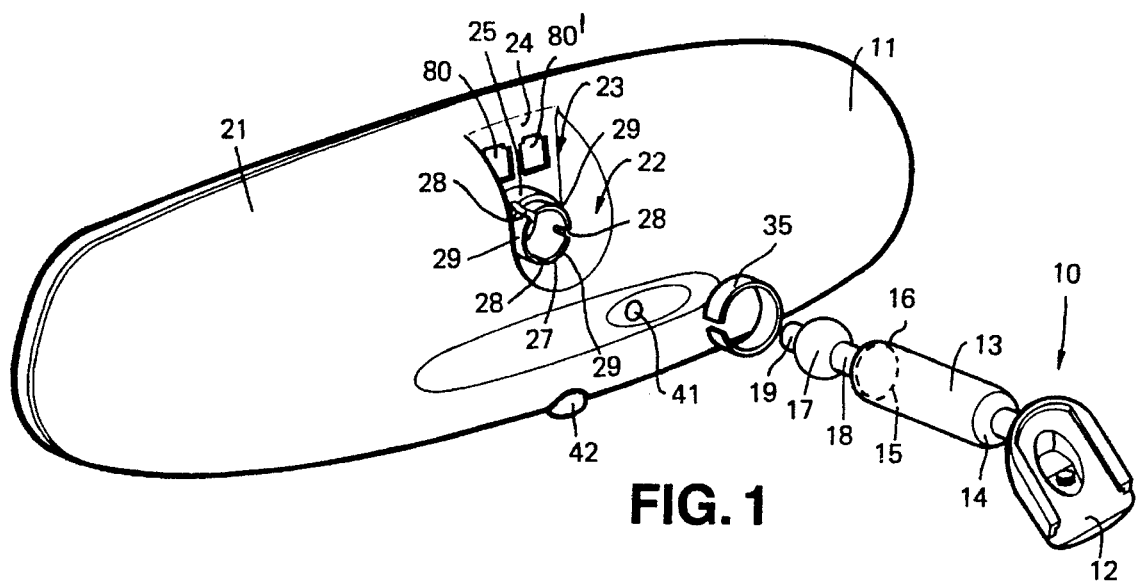
FIG. 1 is a rear perspective view of a mirror support bracket and a mirror case according to the invention.

Referring now to the drawings and in particular to FIG. 1, there is shown therein a support bracket 10 for mounting a mirror case 11 on a vehicle windshield (not shown). The support bracket 10 is of the double articulating ball type known in the art and comprises a support member 12 which is slidably received on a base member (not shown) the base member being fixed to a vehicle windshield, the base member and support member 12 having complementary engaging surfaces as is known in the art so that the support member 12 is blow releasable from the base member. The support bracket 10 further comprises a rearview mirror mounting arm 13 which is mounted to the support member 12 by means of a ball member 14 as is known for example from U.S. Pat. No. 4,936,533 to Donnelly.

A further ball member 15 is mounted within the end 16 of the arm 13 the ball member 15 having integrally formed therewith a ball member 17 spaced from ball member 15 by a neck 18. As will be described, the ball member 17 is engaged with a mirror case 11 so that the position of the case 11 is adjustable on the ball member 17. A retaining means in the form of a cylindrical protrusion 19 is formed on the ball member 17 and acts to substantially prevent disengagement of the mirror case from the ball member 17. The protrusion 19 and ball member 17 may optionally be hollow to accommodate an electrical lead (not shown).

It will be appreciated that the support bracket 10 may comprise other known types of support bracket for example that described in U.S. Pat. No. 5,058,851, the important aspect being that the mirror case is mounted by means of a ball and socket type arrangement according to the conventional technique for universally adjustable support of a mirror case. However, whichever type of support bracket is employed, the important feature is that the ball member onto which the mirror case 11 is mounted is provided with a retaining means to substantially prevent the disengagement of the mirror case 11 from the support bracket 10. The retaining means 19 further enables the angle of pivoting of the mirror case 11 relative to the bracket 10 to be limited if desired.

Figure 9:
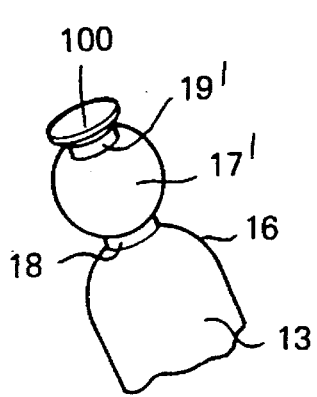
FIG. 9 is a perspective view of another embodiment of a ball member for engaging with a mirror case socket.
Figure 10:
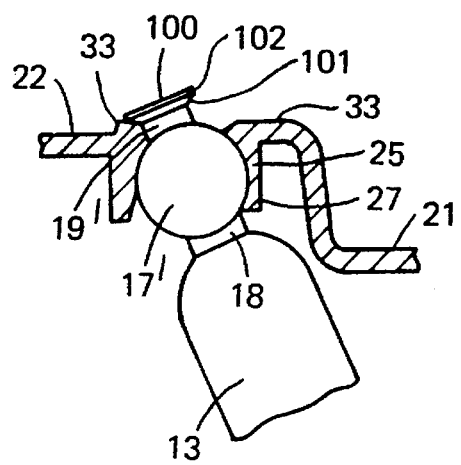
FIG. 10 is a schematic cross-sectional view of the ball member of FIG. 9 cooperating with a mirror case.

In FIG. 9 there is shown a further embodiment of a member 17' for engaging with a mirror case socket. The member 17' is similar to the member 17 (FIG. 1) but the protrusion 19' is further provided with flange means or lock means optionally in the form of a circular disc member 100 integrally formed with the member 17'. As shown more clearly in FIG. 10, the disc member 100 has a slightly bevelled edge 101. The member 17' cooperates with the socket 22 of the mirror case 21 and as shown in FIG. 10 the flange means 100 substantially prevents any possibility of the mirror case 21 being removed from the mounting arm 13 and member 17'. It will be appreciated that the socket 22 is of similar construction to that of FIG. 1. As shown, as the case 21 moves relative to the member 17', eventually the stage is reached where the edge 102 of the disc member 100 engages with the rim 33 of the socket 22 to further prevent any disengagement of the case 21 from the member 17'.

The mirror case 11 of FIG. 1 comprises a curved mirror case body 21 having an integrally formed socket 22 for receiving the ball member 17 of the support bracket 10. The socket 22 is formed in a recess 23 of the case body 21 and projects rearwardly of a generally flat wall region 24. The socket 22 comprises a first cylindrical wall 25 defining at least a partly spherical recess 26 (FIG. 7) for accommodating the spherical ball member 17. A second wall 27 extends rearwardly of said first wall 25, the second wall being of less thickness than the first wall and having an inherent resilience to enable the spherical ball member 17 to be forced into the partly spherical recess 26. Three equiangular slots 28 are provided in the second wall 27 and extend partly into the first wall 25 such that the second wall 27 effectively comprises three part cylindrical resilient flanges 29.

Figure 7:
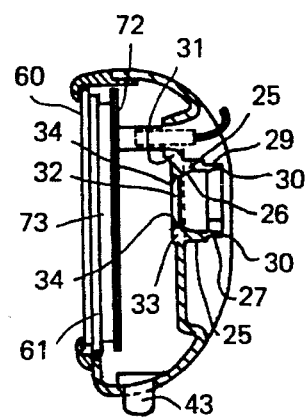
FIG. 7 is a schematic cross-sectional view of the rearview mirror of FIG. 6.

As shown more clearly in FIG. 7, the flanges 29 of the socket 22 taper outwardly so that the thickness of the flanges 29 reduces towards their free ends 30. Also, the diameter of the partly spherical recess 26 is greatest where the wall 25 meets the flanges 29 and the diameter of the recess 26 reduces towards its narrowest at the region 31, which defines the diameter of an aperture 32 opening into the interior of the mirror case 11. An integral strengthening rim 33 is provided around the aperture 32, with the inner surface 34 of the rim 33 being bevelled slightly towards time interior of the mirror case 11 as shown.

In practice the angle of the bevel is 25° relative to a notional horizontal plane.

Figure 2:
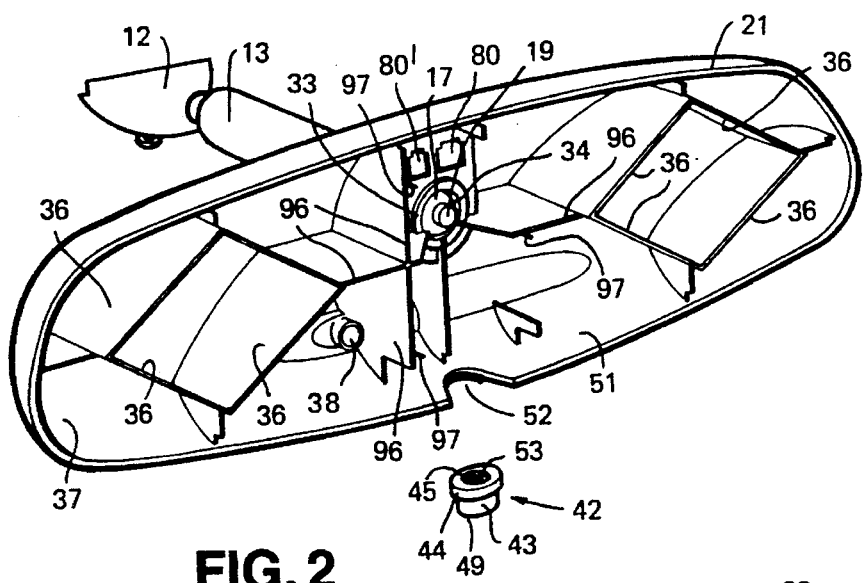
FIG. 2 is a front perspective view of the mirror case of FIG. 1 with the mirror support bracket secured to the mirror case.

The ball member 17 is a push fit into the recess 26 such that the mirror case 11 is securely mounted on the ball member 17 but enables adjustment of the mirror case position on the ball member 17. With the ball member 17 accommodated in the recess 26, the cylindrical protrusion 19 projects slightly into the interior of the mirror case 11 as shown in FIG. 2, so that movement of the mirror case 11 relative to the ball member 17 is limited by the surface 34 of the rim 33 abutting against the protrusion 19. It will be noted however that when the surface 34 abuts the protrusion 19, it is difficult for the mirror case 11 to be disengaged from the ball member 17. Thus, the protrusion 19 acts as a retaining means and results in the advantageous feature that the mirror case 11 is substantially prevented from disengaging from the bracket 10. This is of particular merit since if a user could accidentally remove a mirror case 11 from a supporting 10 bracket 10 it can be extremely difficult to have the mirror case 11 replaced once again.

In engaging the ball member 17 into the recess 26, the flanges 29 are forced apart slightly as may be the outermost part of the first wall 25. Since the slots 28 extend slightly into the first wall 25, the outermost edge of the first wall adjacent to the slots 28 is also slightly resilient to enable the ball member 17 to be forced into the recess 26.

A resilient split ring 35 is provided (FIG. 1) which is a snap fit around the flanges 29 to embrace the flanges and hold them securely to further prevent any unexpected removal of the ball member 17 from the recess 26.

The socket 22 being integrally formed with the mirror case 20 has a number of significant advantages including a substantially simplified construction involving only the minimum number of parts and the construction is thus extremely cost effective, resulting in a low cost assembly and a minimum possibility of vibration, of the mirror case.

Figure 5:
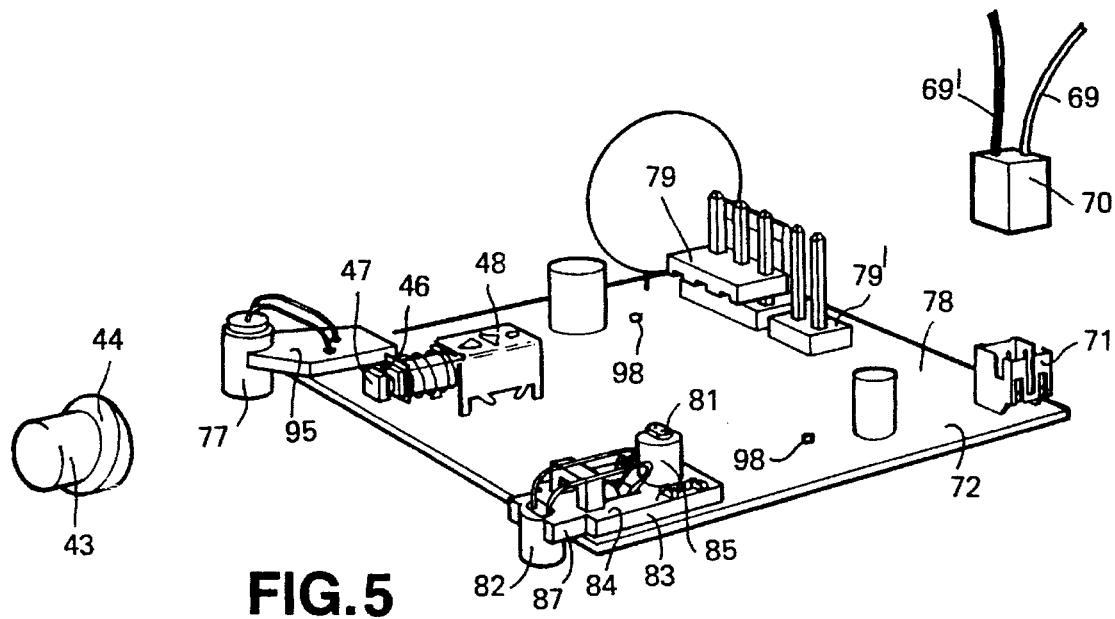
FIG. 5 is a rear perspective view of the circuit board of FIG. 4 and also showing a press button switch.

In FIG. 2 there is shown the interior of the mirror casing 11. A plurality of support flanges 36 are integrally formed on the interior surface 37 of the case body 21 the flanges 36 being arranged to provide support for a reflective element, to be described below. A hollow socket 38 is provided in the case body 21 to accommodate a forward facing light sensor (FIG. 5), the socket 38 having an opening 41 in the rear of the case (FIG. 1).

A press button 42 for a switch is also shown in FIG. 2 and comprises a hollow rubber member 43 having a peripheral flange 44. The press button 42 has an aperture 45 defined by a resilient internal flange 53. The press button 42 is engaged on the operating arm 47 of a two position switch 48 (FIG. 5) so that the flange 53 engages with the recess 46 on the operating arm 47 of the switch 48 thus connecting the button 42 to the switch 48. The bezel 91 also has a flange 50 which engages around the flange 44 of the button. In the assembled mirror, the flange 44 prevents the button 42 from disengaging from the switch 48. The bottom 51 of the case 21 is provided with an opening 52 to accommodate the lower part 49 of the button 42.

Figure 4:
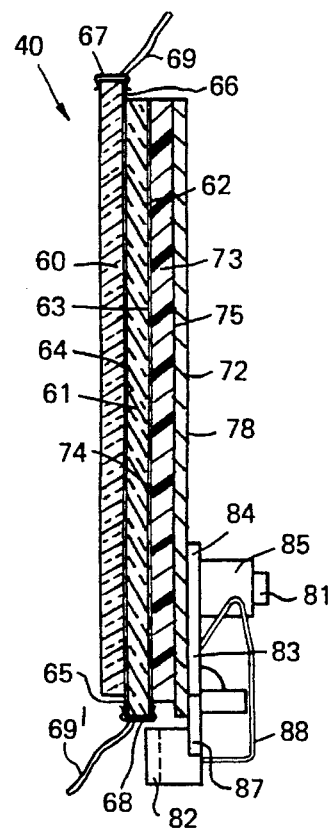
FIG. 4 is a cross sectional view of the reflective element taken along the lines I—I in FIG. 3 but also showing a circuit board on the reflective element.

A cross section of a laminate type electro optic reflective element 40 is shown in FIG. 4, the element 40 optionally and preferably comprising a clear front glass 60 and a mirror 61 having a reflective coating 62 applied to its rear surface 63. As shown, the front glass 60 and mirror 61 are slightly offset relative to each other so that at the upper end time mirror 61 projects below the front glass 60 and at the lower end time front glass 60 projects above the mirror 61. An electro-optic layer 64 is sandwiched in a space between the front glass 60 and the mirror 61 and extends onto the exposed front surface 65 of the mirror 61 at the lower end of the element and also onto the exposed rear surface 66 of the front glass 60 at the upper end of the element. It will be appreciated that the front surface 65 of the mirror 61 and the rear surface 66 of the front glass 60 each lave a transparent electronic conductor such as indium tin oxide or doped tin oxide or the like as conventionally known in the electro-optic device art. An electrical contact in the form of a metal connector strip 67 is secured to the top of the front glass 60 so that it makes electrical contact with the electro-optic layer 64. Similarly, a further electrical contact in the form of a metal connector strip 68 is secured to the lower end of the mirror 61 so that another electrical contact is made with the electro-optic layer. The strips 67, 68 are connected by leads 69, 69' to a plug 70 (FIG. 5) which is in turn plugged into a socket 71 on a printed circuit board 72 as will be described.

Figure 3:
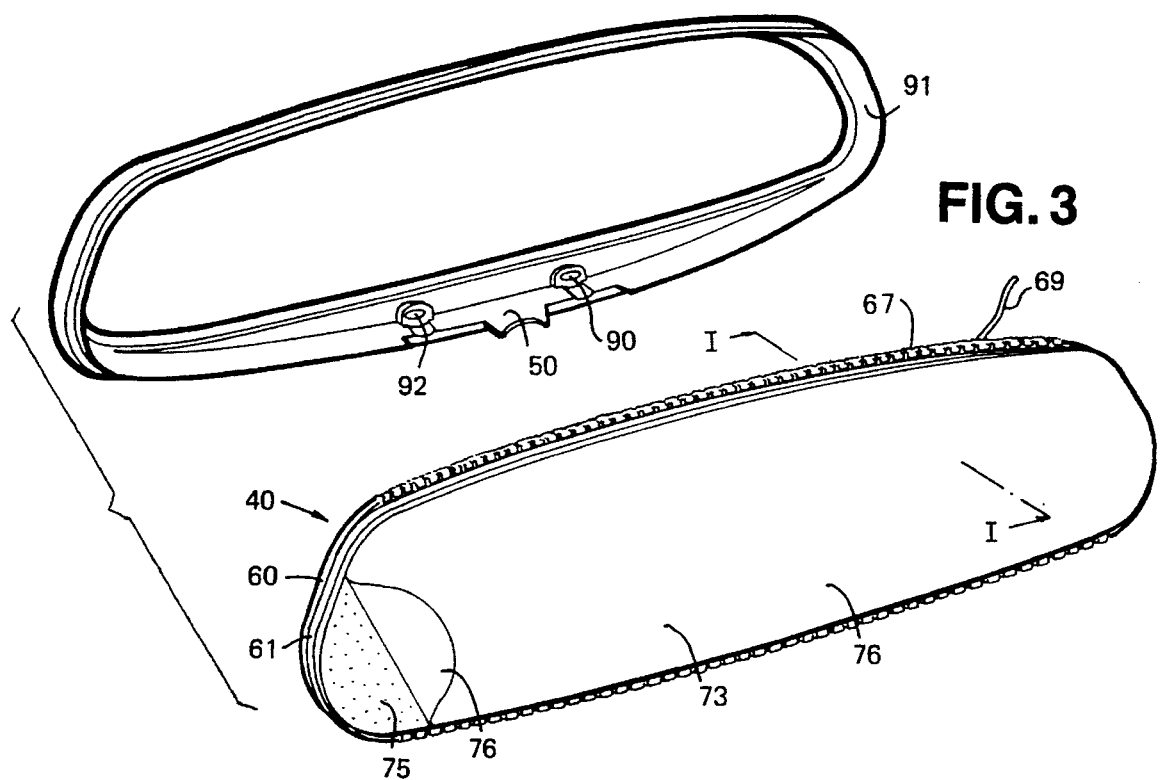
FIG. 3 is a rear perspective view of a reflective element and mirror bezel according to the invention.

A layer of foam material 73, is adhered to the rear surface of the mirror 61 preferably so as to cover substantially the entire rear surface (aside from where items such as through-the-cell photodetectors and information displays such as compass displays are mounted behind the mirror). This foam layer 73 acts, as a resilient means or shock absorber means to reduce the risk of breaking of the front glass 60 and mirror 61 during an impact. The layer of foam material 73 is preferably a cross linked polyethylene foam sold under the name ALVEOLIT 3000 TA (2 mm thick) sold by Vita Cortex Ltd. of Cork, Ireland and is approximately 2 mm in thickness. This foam is sold having an adhesive layer applied to both its front 74 and rear 75 surfaces, these surfaces being covered by a removable sheet of protective foil 76 (FIG. 3). The protective foil on the front surface of the foam layer 73 is simply removed so that the adhesive layer is exposed and the layer of foam is applied to the rear surface of the mirror 61. The foam material substantially extends at east to the central region of the mirror 61 and more preferably substantially covering the entire rear surface of the mirror. The foam material layer 73 may be cut to an exact shape, or the general shape or to any suitable generic shape and can be provided in a roll which has already been established while still attached to a backing material tape or sheet for example the protective foil 76. The thickness of the foam layer 73 is at least 0.5 mm more preferably at least 1 mm and most preferably at least 2 mm. The thickness of the foam layer 73 is preferably less than 5 mm more preferably less than 4 mm and most preferably less than 3 mm. The function of the foam layer 73 is to absorb energy from an impact with the mirror from, for example, a person or object in a vehicle to which the mirror is fitted, and also impact from an air bag in a vehicle. Additionally, the foam layer serves to provide an anti-scatter function in the event of breakage.

A rear surface 78 of the printed circuit board (PCB) 72 carries the various electrical components of an electrical circuit which is used to control the electro-optic layer 64. Any desirable circuit may be employed, for example that described in U.S. Pat. No. 4,886,960 to Donnelly, the contents of which are incorporated herein by reference.

The PCB 72 includes a socket 71 for the plug 70 to electrically connect the electro-optic layer 64 to the circuit on the PCB 72. Further, the PCB 72 includes two sets of electrical pins 79, 79' which are arranged such that when the mirror is assembled, the pins 79, 79' correspond with apertures 80, 80' in the mirror case 21, for connection to a vehicle electrical system.

A two position electrical switch 48 is also mounted on the PCB 72 and has an operating arm 47 having a recess 46. The switch is manufactured by Alps Tohoku Co. Ltd. of Tokyo, Japan. The two positions of the switch are "off" and "automatic", i.e. in the "off" position the control circuit on the PCB 72 is turned off and in the "automatic" position the control circuit applies an electric field to the electro-optic layer 64 dependent on the level of light incident onto forward and rearward light sensors 81, 82, respectively, now to be described. Thus, the control circuit applies an electric field to the electro-optic layer 64 or medium to cause a change in light transmittance of the layer or medium 64. Thus, the reflective element has at least two reflective conditions.

A holder 83 for light sensors 81, 82 is also mounted onto the rear surface 78 of the PCB 72. The holder 83 comprises a plastics base member 84 having a rearwardly projecting cylindrical housing 85 with the forward light sensor 81 mounted at the free end of the housing 85. A pair of suitable wires (not shown) connect the sensor 81 to the control circuit on the PCB, the wires extending through the housing 85. As shown, an integral support bracket 87 extends from the holder 83 and forwardly of the rear surface 78 of the PCB 72. The support bracket 87 carries the rearward facing light sensor 82 which is electrically connected to the control circuit on the PCB 72 by wires 88 which are bent underneath the PCB 72. Also, an LED 77 is mounted on a bracket 95 which is fixed to the rear of the PCB 72.

During assembly of the mirror, the housing 85 is located in the socket 38 so that the forward light sensor 81 looks forwardly through aperture 41 in the mirror case 21. The rearward light sensor 82 corresponds with an aperture 90 in the bezel 91 so that the rearward light sensor 82 looks rearwardly of the mirror through aperture 90. The bezel 91 has a further aperture 92 through which the LED 77 locates to indicate when the mirror is energised.

Figure 6:
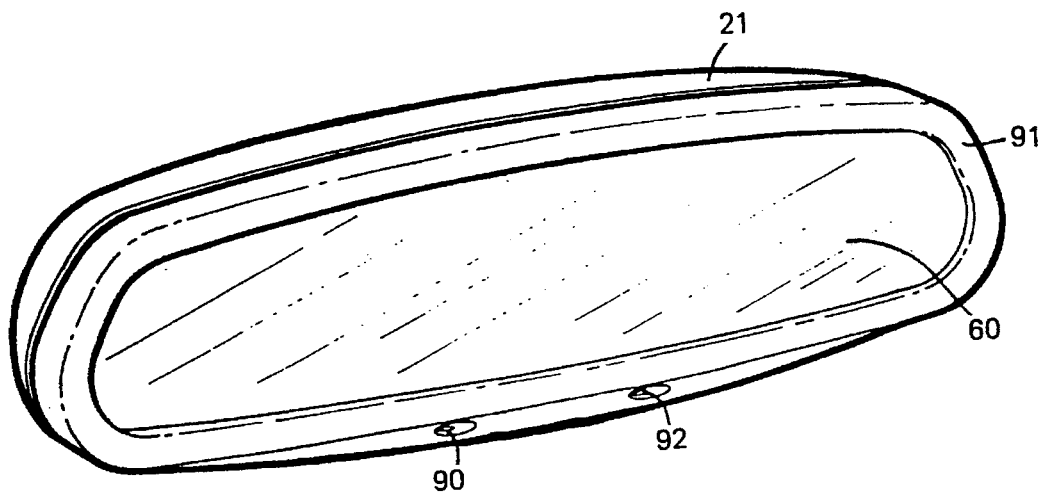
FIG. 6 is a front perspective view of an assembled rearview mirror according to the invention.
Figure 8:
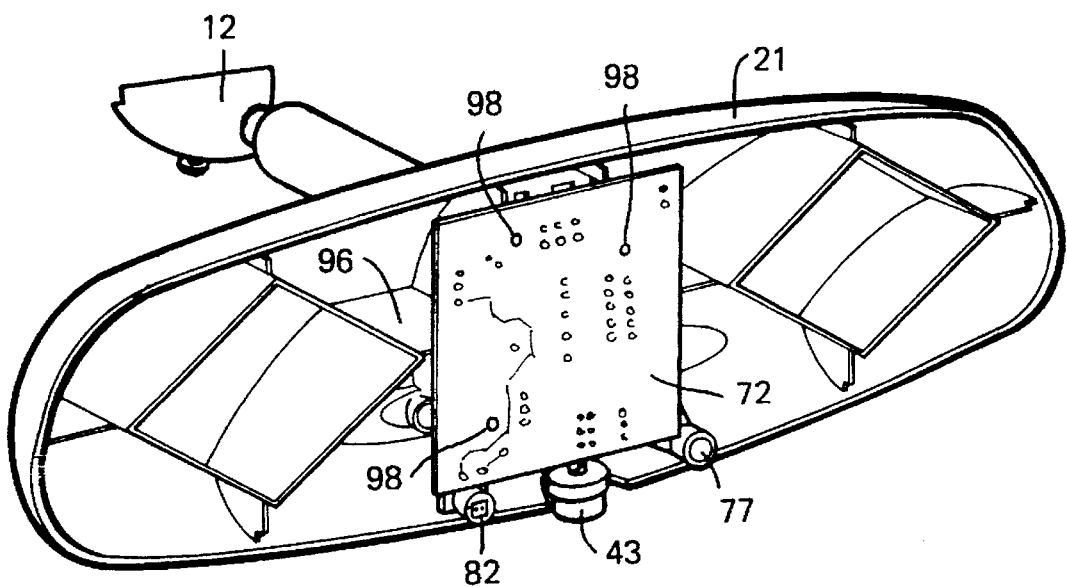
FIG. 8 is a front perspective view of the mirror case with the circuit board in place.

In completing the assembly, the PCB 72 is located in the mirror case so that it abuts the flanges 96 in the mirror case 21 and the housing 85 of the forward facing light sensor 81 is located in the socket 38. Also, a retaining means optionally in the form of one or more pins 97 may be provided on the flanges 96, the pin(s) being a snap fit engagement in aperture(s) 98 in the PCB 72 to hold the PCB 72 firmly in position. The protective foil 76 is completely removed from the rear surface 75 of the foam layer 73 and the reflective element is located in the bezel 91. The bezel 91 containing the reflective element 40 is then brought together with the mirror case 21 so that the rear surface 75 of the foam layer 73 then adheres to the flanges 36 and the PCB 72 by the adhesive on the rear surface 75. With the press button 42 located in position on the switch 48 the bezel 91 is secured to the mirror case 21 in conventional manner so that the final assembled mirror unit is as shown in FIG. 6 with the rearward facing light sensor 82 located within aperture 90 in the bezel 91. The user has simply to press the button 42 upwards to energise the control circuit for the electro-optic layer.

When the bezel 91 is secured in place the foam layer 72 is slightly compressed by the flanges 36 so that the complete structure is quite compact and firmly retained. The flanges 36 provide additional shock absorbing properties for the reflective element as does the PCB 72.

The electro-optic layer 64 may of course comprise any suitable or desirable material, for example electrochromic, liquid crystal or other materials which have desirable electro-optic properties. The foam layer of this invention is particularly useful with electrochromic rearview mirror devices, such as those described in U.S. Pat. No. 5,140,455 and U.S. Pat. No. 5,151,816 and European Application Nos. 92308022.0, or as described for example in the following papers:- N. R. Lynam, "Electrochromic Automotive Day/Night Mirrors", *SAE Technical Paper Series*, 870636 (1987); N. R. Lynam, "Smart Windows for Automobiles", *SAE Technical Paper Series*, 900419 (1990); N. R. Lynam and A. Agrawal, "Automotive Applications of Chromogenic Materials", *Large Area Chromogenics: Materials & Devices for Transmittance Control*, C. M. Lampert and C. G. Granquist, eds., Optical Eng'g Press, Washington (1990).

It will be appreciated that the support bracket 10 incorporating the protrusion 19 according to the invention may be usefully employed for mounting any type of mirror case onto a vehicle. Further, it will be appreciated that the mirror case 21 incorporating the integral socket 22 may be used for supporting any desired form of reflective element. The case 21 and socket 22 are moulded from ABS (Acrylonitrile/Butadiene/Styrene) manufactured by BASF of Ludwigshafen, Germany.

We claim:

1. A support bracket for mounting a rearview mirror on a vehicle, said support bracket having two ends, means at one end for mounting said bracket to a vehicle, and means at the other end for mounting the rearview mirror, said means for mounting the rearview mirror further including a generally spherical ball for insertion in a complementary socket provided in a mirror case of the rearview mirror, and retaining means for substantially preventing disengagement of said spherical ball from the socket, said retaining means including a protrusion on said spherical ball, said protrusion having a free end adapted to project into an aperture in the socket in the mirror case, the socket aperture having a predetermined width, said protrusion having a width less than the width of the socket aperture whereby movement of said spherical ball out of the socket is prevented.

2. A support bracket as claimed in claim 1, wherein the rearview mirror is a vehicle interior rearview mirror.

3. A support bracket as claimed in claim 1, wherein said protrusion includes a generally cylindrical member integrally formed with said spherical ball.

4. A support bracket as claimed in claim 1 in combination with the vehicle rearview mirror, said rearview mirror including a reflective element actuatable between at least two reflective conditions.

5. The combination as claimed in claim 4, wherein said reflective element has a shock absorbing means for absorbing shocks abutting a rear surface of said reflective element.

6. The combination as claimed in claim 4, wherein said reflective element has a resilient means for providing resiliency abutting a rear surface of said reflective element.

7. A support bracket as claimed in claim 1, wherein the rearview mirror is of the type including a mirror case having a case body and an integrally formed socket for receiving said spherical ball.

8. A support bracket for mounting an article on a vehicle, said support bracket having means at one end for mounting the bracket onto a vehicle and means at the other end for mounting a vehicle rearview mirror, said means for mounting the rearview mirror further comprising retaining means to substantially prevent disengagement of the rearview mirror from said bracket;

said means for mounting the rearview mirror including generally a spherical ball for insertion in a complementary socket provided in a mirror case of the rearview mirror;

said retaining means including a protrusion provided on the spherical ball, said protrusion acting to substantially prevent disengagement of the mirror case from said bracket, said protrusion including a generally cylindrical member integrally formed with said spherical ball and flange means for further preventing disengagement of said mirror case from said bracket.

9. A rearview mirror case, wherein said case comprises a case body having an integrally formed socket for receiving one end of a complementary support bracket, said socket projecting rearwardly of said mirror case and including a first wall defining at least a partially spherical recess for accommodating a spherical ball provided on one end of the support bracket, and a second wall extending rearwardly of said first wall, said second wall being of lesser thickness than said first wall and having an inherent resilience to enable the spherical ball of the bracket to be forced into said partially spherical recess, said second wall having a plurality of slots which extend slightly into said first wall such that said second wall comprises a plurality of wall portions.

10. A rearview mirror case as claimed in claim 9, wherein a resilient split ring is provided to embrace said wall portions of said second wall to cause said second wall portions to close slightly around said spherical ball of said bracket when said spherical ball is accommodated in said socket.

11. A rearview mirror case as claimed in claim 9, wherein said mirror case supports a reflective element and a shock absorbing means for absorbing shocks abuts a rear surface of said reflective element.

12. A rearview mirror as claimed in claim 9, wherein said mirror case supports a reflective element and a resilient means for providing resiliency abuts a rear surface of said reflective element.

13. A reflective element for a rearview mirror, said reflective element comprising a reflective element having a rear surface and being actuatable between at least two reflective conditions, and shock absorbing means abutting said rear surface of said reflective element;

said shock absorbing means including a layer of foam material adhered to said rear surface of said reflective element, said layer of foam material having an adhesive rear surface;

said reflective element also including a circuit board attached to said adhesive rear surface, said circuit board containing a circuit for controlling the reflective condition of said reflective element.

14. A reflective element as claimed in claim 13, wherein said foam material comprises a cross-linked polyethylene foam.

* * * * *

UNITED STATES PATENT AND TRADEMARK OFFICE
CERTIFICATE OF CORRECTION

PATENT NO.    : 5,572,354
DATED         : November 5, 1996
INVENTOR(S)   : John Desmond et al.

It is certified that error appears in the above-identified patent and that said Letters Patent is hereby corrected as shown below:

Column 4, line 23:
  "time" should be --the--.
Column 4, line 43:
  "10" after "supporting" should be deleted.
Column 5, line 21:
  "time" should be --the--.
Column 5, line 22:
  "time" should be --the--.
Column 5, line 30:
  "lave" should be --have--.
Column 5, line 59:
  "east" should be --least--.

Signed and Sealed this

Ninth Day of February, 1999

Attest:

Attesting Officer

*Acting Commissioner of Patents and Trademarks*